(12) United States Patent
Takahashi et al.

(10) Patent No.: US 11,128,195 B2
(45) Date of Patent: Sep. 21, 2021

(54) MOTOR

(71) Applicant: NIDEC SERVO CORPORATION, Kiryu (JP)

(72) Inventors: Ryotaro Takahashi, Kiryu (JP); Koji Mizukami, Kiryu (JP)

(73) Assignee: NIDEC SERVO CORPORATION, Gunma (JP)

(*) Notice: Subject to any disclaimer, the term of this patent is extended or adjusted under 35 U.S.C. 154(b) by 0 days.

(21) Appl. No.: 16/629,208

(22) PCT Filed: Sep. 18, 2018

(86) PCT No.: PCT/JP2018/034328
§ 371 (c)(1),
(2) Date: Jan. 7, 2020

(87) PCT Pub. No.: WO2019/065333
PCT Pub. Date: Apr. 4, 2019

(65) Prior Publication Data
US 2021/0091627 A1 Mar. 25, 2021

(30) Foreign Application Priority Data
Sep. 29, 2017 (JP) .............................. JP2017-191853

(51) Int. Cl.
*H02K 7/00* (2006.01)
*H02K 5/173* (2006.01)
(Continued)

(52) U.S. Cl.
CPC ......... *H02K 5/1732* (2013.01); *F16C 35/063* (2013.01); *H02K 7/083* (2013.01); *F16C 2380/26* (2013.01)

(58) Field of Classification Search
CPC .... H02K 5/1732; H02K 7/083; F16C 35/063; F16C 2380/26
(Continued)

(56) References Cited

U.S. PATENT DOCUMENTS

| 4,259,603 | A | * | 3/1981 | Uchiyama | ............ | H02K 1/2786 |
| | | | | | | 310/156.21 |
| 6,161,274 | A | * | 12/2000 | Stark | ........................ | H02K 5/00 |
| | | | | | | 29/596 |
| 2014/0035405 | A1 | | 2/2014 | Mao et al. | | |

FOREIGN PATENT DOCUMENTS

| CN | 203326769 U | 12/2013 |
| CN | 103580360 A | 2/2014 |

(Continued)

OTHER PUBLICATIONS

Official Communication issued in International Patent Application No. PCT/JP2018/034328, dated Nov. 27, 2018.
(Continued)

*Primary Examiner* — Terrance L Kenerly
(74) *Attorney, Agent, or Firm* — Keating & Bennett, LLP (57) ABSTRACT

A motor includes a cover with first and second cup bodies. A flange portion of each of the first and second cup bodies includes first recesses recessed radially inward from an outer peripheral edge of the flange portion and evenly spaced apart in a circumferential direction of the flange portion, second recesses recessed radially inward from the outer peripheral edge of the flange portion, have a same circumferential width as that of the first recess, and are evenly spaced apart in the circumferential direction, a total number of the second recesses is the same as a total number of first recesses, and claw portions extending radially outward from a bottom surface of the corresponding second recess and have a circumferential width narrower than that of the second recess.

14 Claims, 8 Drawing Sheets

(51) Int. Cl.
*F16C 35/063* (2006.01)
*H02K 7/08* (2006.01)

(58) Field of Classification Search
USPC .................................................. 310/89, 90
See application file for complete search history.

(56) References Cited

FOREIGN PATENT DOCUMENTS

| | | |
|---|---|---|
| CN | 203883586 U | 10/2014 |
| JP | 63-55759 U | 4/1988 |

OTHER PUBLICATIONS

Official Communication issued in corresponding Chinese Patent Application No. 201880045754.5, dated Jan. 22, 2021.

\* cited by examiner

MOTOR

CROSS REFERENCE TO RELATED APPLICATIONS

This is a U.S. national stage of PCT Application No. PCT/JP2018/034328, filed on Sep. 18, 2018, and priority under 35 U.S.C. § 119(a) and 35 U.S.C. § 365(b) is claimed from Japanese Application No. 2017-191853, filed Sep. 29, 2017; the entire disclosures of which are hereby incorporated herein by reference.

FIELD OF THE INVENTION

The present disclosure relates to a motor.

BACKGROUND

In a conventional electric motor, a pair of brackets formed by pressing a metal plate are attached to both sides of a stator core. A locking piece is provided on one side of the mounting edge of the bracket, and two locking claws are provided on the other side. The pair of brackets are fixed by crimping one locking claw to a locking piece on the other side.

In a case where a cover of a motor has a pair of cup bodies and the pair of cup bodies are fixed with their openings facing each other, it has been difficult to align the cup bodies coaxially at the time of assembly of the motor.

SUMMARY

One example embodiment of a motor of the present disclosure includes a rotor that includes a motor shaft extending along a central axis, a stator that opposes the rotor with a gap interposed therebetween in a radial direction, a pair of bearings that rotatably support the motor shaft, and a cover that accommodates the rotor and the stator. The cover includes a first cup body and a second cup body both having a bottomed tubular shape. Each of the first cup body and the second cup body includes a bottom wall portion that includes a bearing holding portion to hold the bearings, a tubular peripheral wall portion that extends in an axial direction from an outer peripheral edge of the bottom wall portion, and a ring-shaped flange portion that extends radially outward from an end edge of the peripheral wall portion opposite to the bottom wall portion. The flange portion of each of the first cup body and the second cup body includes multiple first recesses that are recessed radially inward from an outer peripheral edge of the flange portion and are evenly spaced apart in a circumferential direction of the flange portion, second recesses that are recessed radially inward from the outer peripheral edge of the flange portion, each of the second recesses having a same circumferential width as that of each of the first recesses, and are evenly spaced apart in the circumferential direction, a number of which is the same as a number of first recesses, and claw portions that each extend radially outward from a bottom surface of the corresponding second recess and have a circumferential width narrower than that of the second recess. The first cup body and the second cup body are arranged with their flange portions in contact with each other in the axial direction, and are fixed by hooking the claw portions on the first recesses.

Additionally, another example embodiment of the motor of the present disclosure includes a rotor that includes a motor shaft extending along a central axis, a stator that opposes the rotor with a gap interposed therebetween in the radial direction, a pair of bearings that rotatably support the motor shaft, and a cover that accommodates the rotor and the stator. The cover includes a first cup body and a second cup body both having a bottomed tubular shape. Each of the first cup body and the second cup body includes a bottom wall portion that includes a bearing holding portion to hold the bearings, a tubular peripheral wall portion that extends in the axial direction from an outer peripheral edge of the bottom wall portion, and a ring-shaped flange portion that extends radially outward from an end edge of the peripheral wall portion opposite to the bottom wall portion. The flange portion includes a first recess that is recessed radially inward from an outer peripheral edge of the flange portion, a second recess that is arranged 180 degrees away from the first recess in a circumferential direction of the flange portion, and includes a same circumferential width as that of the first recess, and a claw portion that extends radially outward from a bottom surface of the second recess and has a circumferential width narrower than that of the second recess. The first cup body and the second cup body are arranged with their flange portions in contact with each other in the axial direction, and are fixed by hooking the claw portion of one of the first cup body and the second cup body on the first recess of the other.

The above and other elements, features, steps, characteristics and advantages of the present disclosure will become more apparent from the following detailed description of the example embodiments with reference to the attached drawings.

DETAILED DESCRIPTION

As shown in FIGS. 1 to 4, a motor 1 of the present example embodiment includes a cover 5, stud bolts 22, a wiring member 50, a rotor 2 having a motor shaft 3 extending along a central axis J, a stator 4, a pair of bearings 7, a base plate 20, a heat sink 21, and screw members 25. Of both end portions of the motor shaft 3, a first end portion where an output end 3a is located is disposed outside the cover 5. A fan or the like (not shown) that is rotated by the motor 1 is connected to the output end 3a.

In the present example embodiment, a direction parallel to the central axis J is simply referred to as "axial direction".

Of both end portions of the motor shaft 3, a direction from the first end portion where the output end 3a is located to a second end portion different from the first end portion is referred to as one axial side. One axial side is the left side in FIG. 4. A direction from the second end portion of the motor shaft 3 to the first end portion thereof is referred to as the other axial side. The other axial side is the right side in FIG. 4. The radial direction around the central axis J is simply referred to as "radial direction". Of the radial directions, a direction approaching the central axis J is referred to as a radial inner side, and a direction separating from the central axis J is referred to as a radial outer side. The circumferential direction around the central axis J is simply referred to as "circumferential direction".

Figure 4:
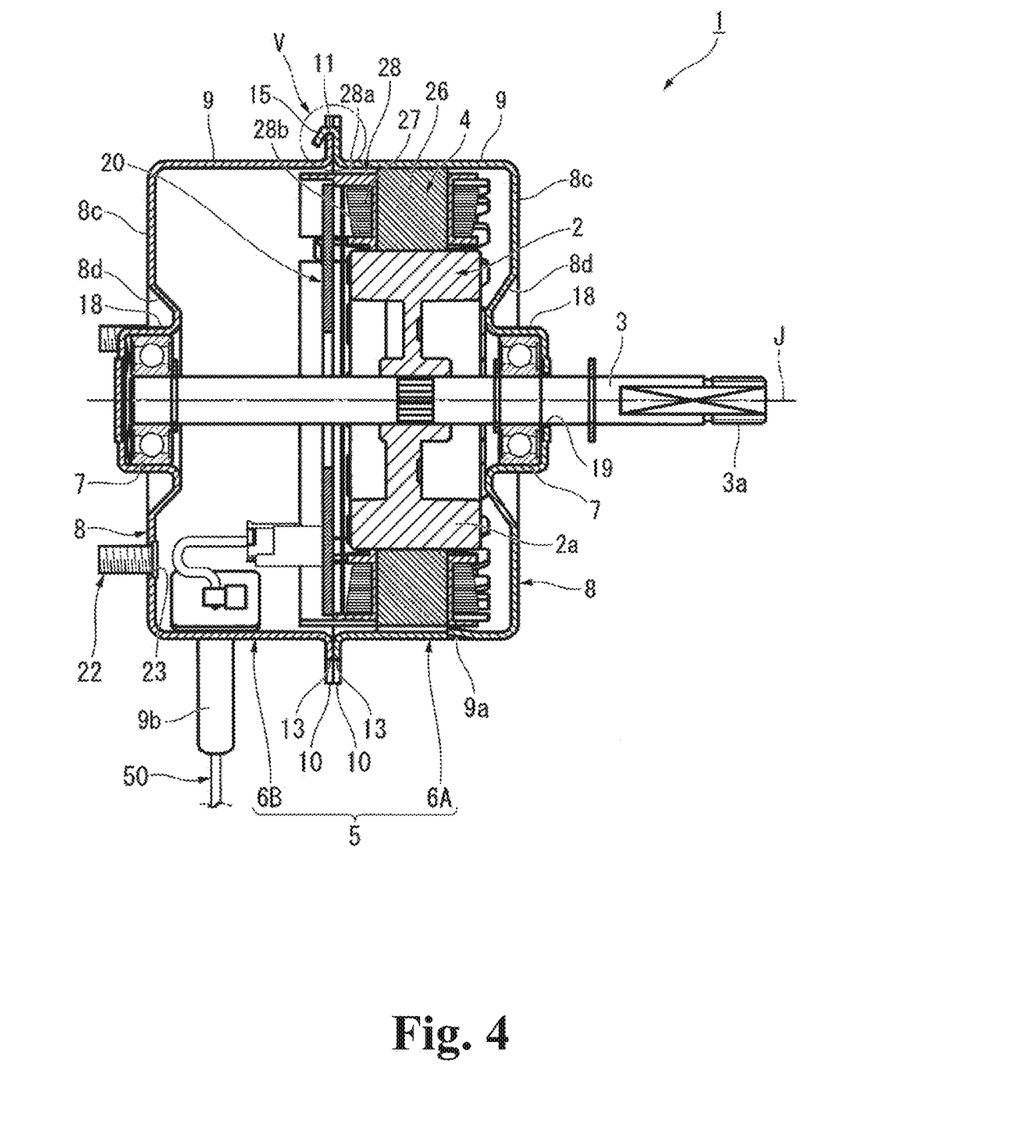
FIG. 4 is a cross-sectional view showing a IV-IV section of FIG. 3.

As shown in FIG. 4, the cover 5 accommodates the rotor 2, the stator 4, the bearings 7, the base plate 20, and the heat sink 21 (not shown). The cover 5 has a first cup body 6A and a second cup body 6B. The cover 5 has the first cup body 6A and the second cup body 6B both having bottomed tubular shapes. Each of the first cup body 6A and the second cup body 6B has a bottomed tubular shape centered on the central axis J. In the example of the present example embodiment, the first cup body 6A accommodates a rotor magnet 2a (to be described later) of the rotor 2, the stator 4, and one of the pair of bearings 7 located on the other axial side. The second cup body 6B accommodates one of the pair of bearings 7 located on one axial side, the base plate 20, and the heat sink 21.

The cover 5 is made of sheet metal. The first cup body 6A and the second cup body 6B are made of sheet metal. The first cup body 6A and the second cup body 6B are made of a steel plate, for example. The first cup body 6A and the second cup body 6B have the same axial dimension and radial dimension. The first cup body 6A and the second cup body 6B are press-molded into a cup shape using the same mold. That is, the first cup body 6A and the second cup body 6B are press-molded products. The cover 5 is a pressed cover.

The first cup body 6A is located on the other axial side of the second cup body 6B. The second cup body 6B is located on one axial side of the first cup body 6A. The first cup body 6A opens to one axial side. The second cup body 6B opens to the other axial side. The first cup body 6A and the second cup body 6B each have a bottom wall portion 8, a peripheral wall portion 9, and a flange portion 10. That is, the cover 5 includes the bottom wall portion 8 and the peripheral wall portion 9 as wall portions. The first cup body 6A and the second cup body 6B are arranged with openings of the peripheral wall portion 9 facing each other. The first cup body 6A and the second cup body 6B are fixed to each other with their openings facing each other in the axial direction. As will be described later, the flange portions 10 of the first cup body 6A and the second cup body 6B are fixed to each other. In a state where the first cup body 6A and the second cup body 6B are fixed to each other, the inside of the first cup body 6A and the inside of the second cup body 6B communicate with each other.

The bottom wall portion 8 has a bearing holding portion 18, a flat portion 8c, and a connection portion 8d. The bearing holding portion 18 has a bottomed tubular shape. The bearing holding portion 18 has a bottomed cylindrical shape centered on the central axis J. The bearing holding portion 18 opens toward the inside of the cover 5. The bearing holding portion 18 holds the bearing 7. The bearing 7 is a ball bearing, for example. The bearing 7 is fitted into the bearing holding portion 18 and fixed. In the cover 5, a pair of bearings 7 are arranged apart from each other in the axial direction. The pair of bearings 7 are disposed in both end portions of the cover 5 in the axial direction. The pair of bearings 7 rotatably support the motor shaft 3. The bearing 7 supports the motor shaft 3 so that the motor shaft 3 is rotatable about the central axis J.

The bottom wall portion 8 of the first cup body 6A is provided with a shaft insertion hole 19 that penetrates the bottom wall portion 8 in the axial direction. The shaft insertion hole 19 is provided in the bearing holding portion 18 of the first cup body 6A. The shaft insertion hole 19 is a through hole that penetrates a bottom portion of the bearing holding portion 18. The motor shaft 3 is inserted into the shaft insertion hole 19. The motor shaft 3 passes through the shaft insertion hole 19 and protrudes to the outside from the inside of the cover 5.

The flat portion 8c has a ring shape extending in the circumferential direction. The flat portion 8c has an annular plate shape centered on the central axis J. A plate surface of the flat portion 8c is oriented in the axial direction and spreads in a direction perpendicular to the central axis J. The radial position of the flat portion 8c is disposed outside the radial position of the bearing holding portion 18. The flat portion 8c surrounds the bearing holding portion 18 from the outside in the radial direction. In radial view, the flat portion 8c is disposed in a position overlapping the bearing holding portion 18. The flat portion 8c is connected to the peripheral wall portion 9. An outer edge portion of the flat portion 8c is connected to an end portion of the peripheral wall portion 9 on the opposite side of the opening in the axial direction.

A stud through hole 23 is provided in the bottom wall portion 8 of the second cup body 6B. The second cup body 6B has multiple stud through holes 23 that penetrate the bottom wall portion 8 in the axial direction. The stud through hole 23 is a circular hole, for example. The stud through hole 23 is provided in the flat portion 8c of the second cup body 6B. The stud through hole 23 penetrates the flat portion 8c of the second cup body 6B in the axial direction. The multiple stud through holes 23 are spaced apart in the circumferential direction in the bottom wall portion 8. The multiple stud through holes 23 are evenly spaced apart in the circumferential direction in the flat portion 8c.

Multiple stud bolts 22 are provided in the bottom wall portion 8 of the second cup body 6B. The stud bolt 22 projects to one axial side from the bottom wall portion 8 of the second cup body 6B. The multiple stud bolts 22 are spaced apart in the circumferential direction in the bottom wall portion 8. In the illustrated example, four stud bolts 22 are evenly spaced apart in the circumferential direction in the bottom wall portion 8. The stud bolt 22 is inserted into the stud through hole 23 and attached to the bottom wall portion 8. The stud bolt 22 is press-fitted into the stud through hole 23 and fixed to the flat portion 8c. The motor 1 is mounted and fixed, by using the stud bolts 22, to an apparatus frame or the like (not shown) that is an object onto which the motor 1 is mounted.

A screw attachment hole (not shown) is provided in the bottom wall portion 8 of the second cup body 6B. The second cup body 6B has a screw attachment hole that penetrates the bottom wall portion 8 in the axial direction. The screw attachment hole is a circular hole, for example. Multiple screw attachment holes are provided in the flat portion 8c of the second cup body 6B. The screw attachment hole penetrates the flat portion 8c of the second cup body 6B in the axial direction. The multiple screw attachment holes are spaced apart in the circumferential direction in the bottom wall portion 8. There are two screw attachment holes. The screw member 25 described later is inserted into the screw attachment hole.

The connection portion 8*d* connects the bearing holding portion 18 and the flat portion 8*c*. The connection portion 8*d* connects an opening of a tubular portion of the bearing holding portion 18 and the inner peripheral edge of the flat portion 8*c*. The connection portion 8*d* is disposed between the bearing holding portion 18 and the flat portion 8*c*. The connection portion 8*d* is located between the bearing holding portion 18 and the flat portion 8*c* along the radial direction. In the example of the present example embodiment, the connection portion 8*d* has a tapered tubular shape centered on the central axis J. The connection portion 8*d* extends toward the opening of the peripheral wall portion 9 along the axial direction while extending radially inward from the flat portion 8*c*. That is, the connection portion 8*d* of the first cup body 6A extends toward one axial side while extending radially inward from the flat portion 8*c*. The connection portion 8*d* of the second cup body 6B extends toward the other axial side while extending radially inward from the flat portion 8*c*.

The peripheral wall portion 9 has a tubular shape centered on the central axis J. The peripheral wall portion 9 has a cylindrical shape. The peripheral wall portion 9 extends in the axial direction from the outer peripheral edge of the bottom wall portion 8. The peripheral wall portion 9 opens to the opposite side of the bottom wall portion 8 in the axial direction. An opening is located in an end portion of the peripheral wall portion 9 on the opposite side of the bottom wall portion 8 in the axial direction. An end portion of the peripheral wall portion 9 on the opposite side of the opening in the axial direction is closed by the bottom wall portion 8.

Multiple stator support claws 9*a* are provided on the peripheral wall portion 9 of the first cup body 6A. The stator support claws 9*a* protrude into the first cup body 6A from the peripheral wall portion 9. The multiple stator support claws 9*a* are evenly spaced apart in the circumferential direction in the peripheral wall portion 9. The stator support claw 9*a* comes into contact with the stator 4 disposed in the first cup body 6A from the other axial side. The stator support claw 9*a* supports the stator 4 toward one axial side.

As shown in FIGS. 1 to 4, the peripheral wall portion 9 of the second cup body 6B has a through hole 17 and a bush 9*b*. That is, the cover 5 has the through hole 17 and the bush 9*b*. The through hole 17 is provided in the peripheral wall portion 9 of the second cup body 6B, and penetrates the peripheral wall portion 9 in the radial direction. The through hole 17 has a polygonal hole shape, for example. In the example of the present example embodiment, the through hole 17 has a rectangular hole shape.

The bush 9*b* is inserted into the through hole 17 and fixed to the peripheral wall portion 9. The bush 9*b* is attached to the through hole 17. The bush 9*b* can be elastically deformed. The bush 9*b* has a tubular shape. The bush 9*b* has a polygonal tube shape. In the example of the present example embodiment, the bush 9*b* has a square tube shape with a rectangular cross section. The bush 9*b* extends from the inside of the cover 5 to the outside through the through hole 17. Of the bush 9*b*, an inner end portion that comes into contact with the peripheral wall portion 9 from the radially outer side has a larger outer diameter than that of an outer portion located on the radially outer side of the inner end portion. Although not shown, the inner end portion of the bush 9*b* has a smaller inner diameter than that of the outer portion. That is, the wall thickness of the inner end portion is thicker than the wall thickness of the outer portion. The bush 9*b* has a collar portion (not shown) located inside the cover 5. The collar portion faces the peripheral wall portion 9 from the inside of the cover 5. The collar portion comes into contact with the peripheral wall portion 9 from the inside of the cover 5. A groove portion that fits into the through hole 17 is provided between the collar portion and the inner end portion of an outer peripheral surface of the bush 9*b*.

The cover 5 has a wiring outlet (not shown). The wiring outlet is provided in the bush 9*b*. The wiring outlet is disposed in the bush 9*b*. The wiring outlet is located in a radially inner end portion of a hole that penetrates the bush 9*b* in the radial direction. The wiring outlet opens in the peripheral wall portion 9 of the cover 5 and communicates with the outside and inside of the cover 5.

Figure 1:
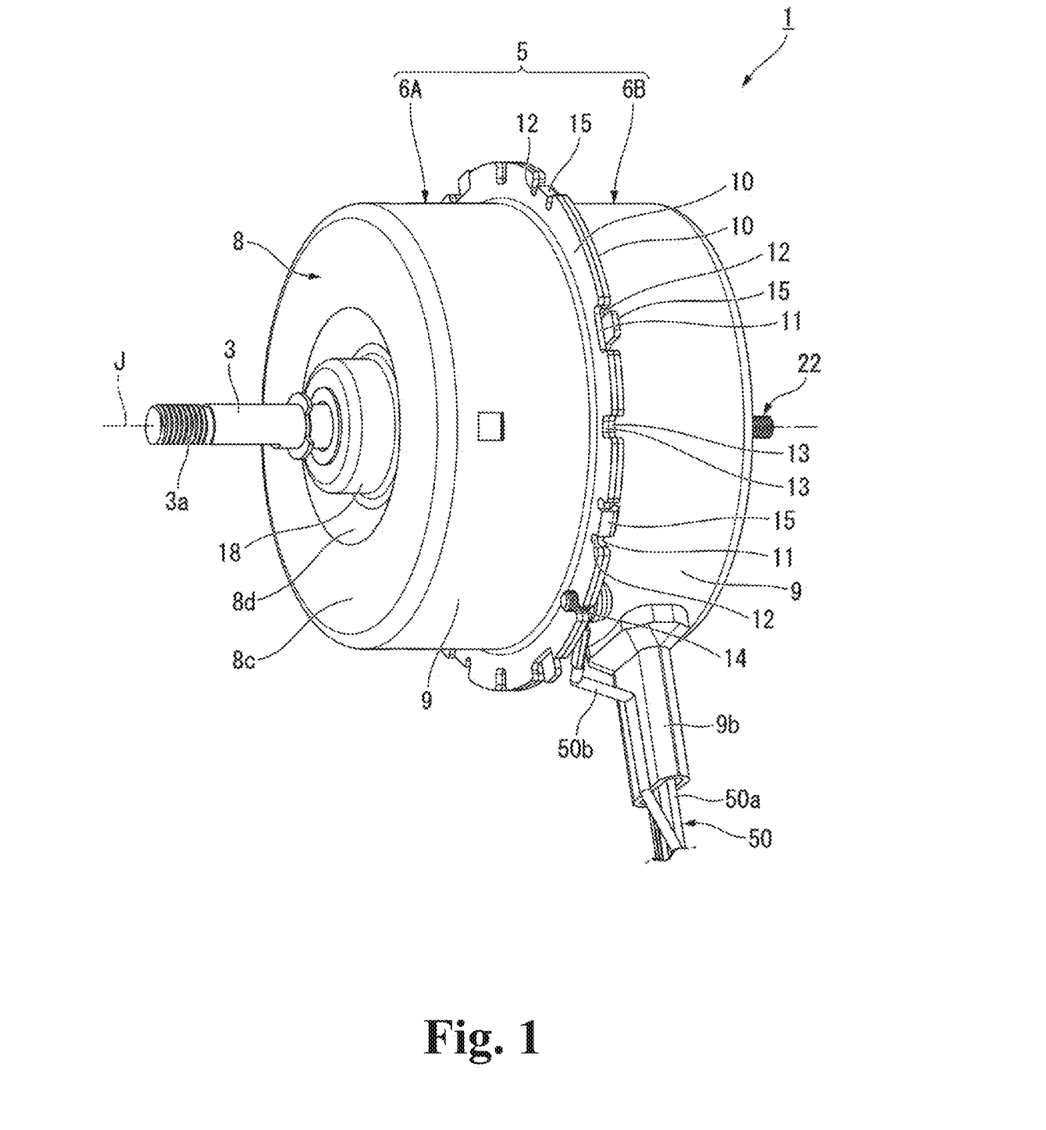
FIG. 1 is a perspective view showing a motor of a first example embodiment of the present disclosure.
Figure 2:
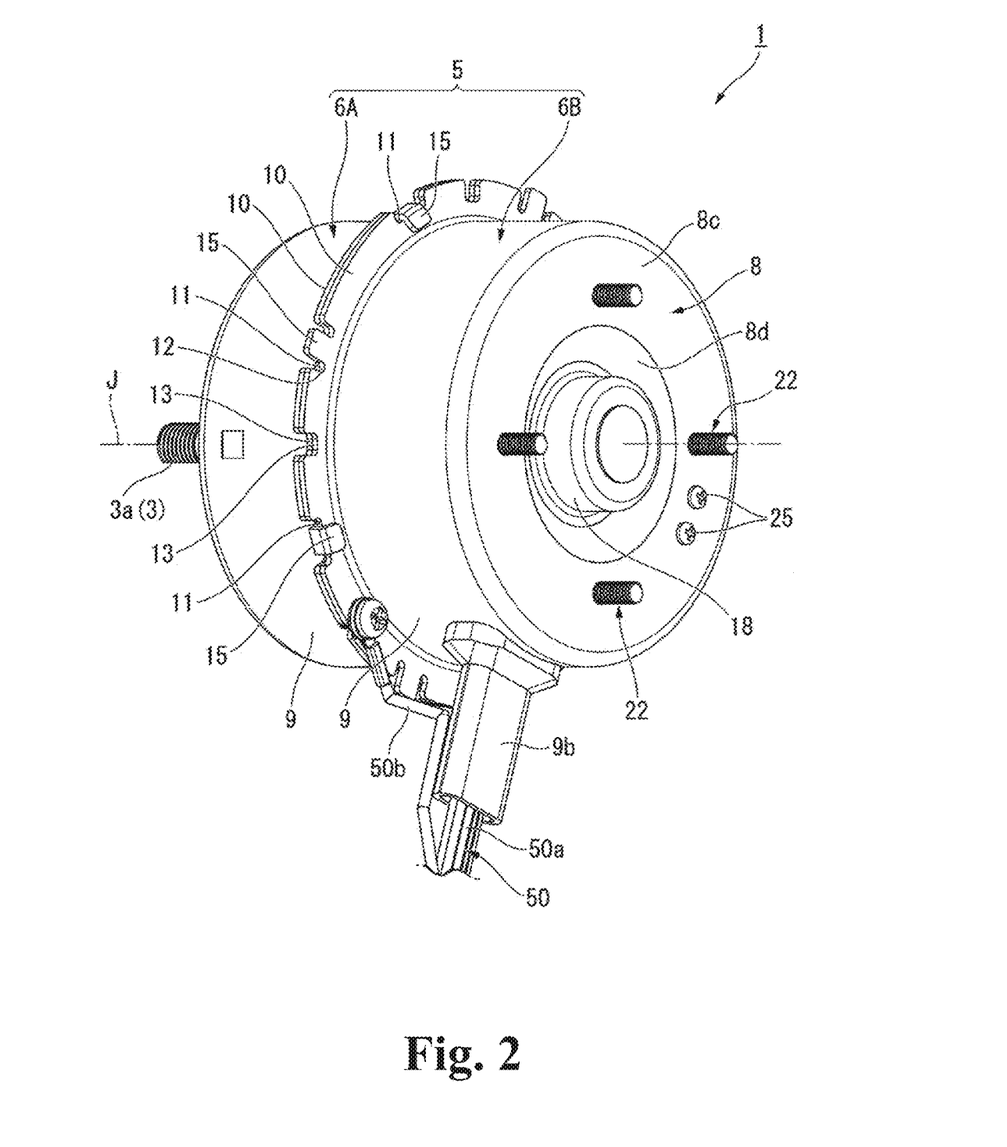
FIG. 2 is a perspective view showing the motor of the first example embodiment of the present disclosure.
Figure 3:
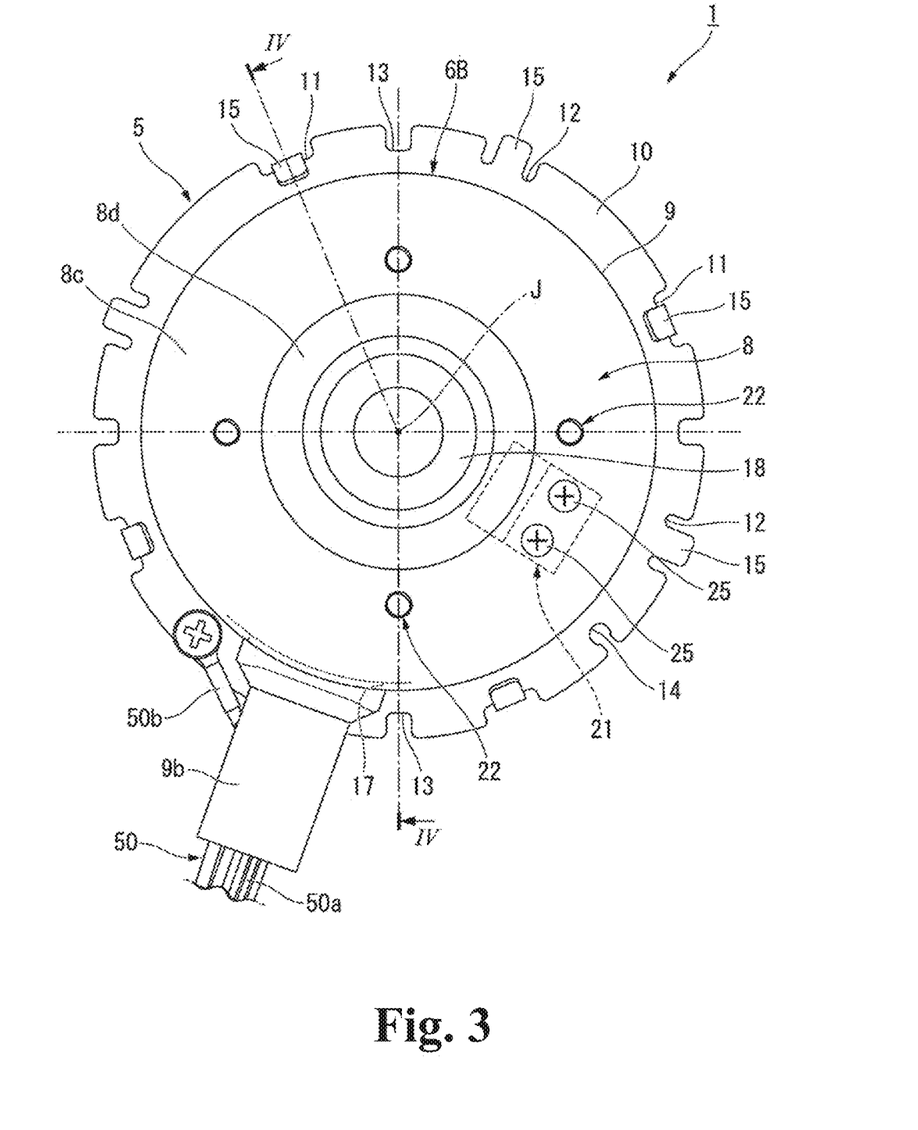
FIG. 3 is a plan view of the motor of the first example embodiment of the present disclosure as viewed toward the other axial side.

As shown in FIG. 4, the wiring member 50 is electrically connected to the base plate 20. As shown in FIGS. 1 to 3, the wiring member 50 includes multiple cables 50*a* and one grounding wire 50*b*. The multiple cables 50*a* are connected to the base plate 20 and extend from the inside of the cover 5 to the outside through the wiring outlet. That is, the cables 50*a* extend from the inside of the cover 5 to the outside through the bush 9*b*. The cables 50*a* extend in a curved manner between the wiring outlet and the base plate 20 (see FIG. 4). The cables 50*a* may be rephrased as a board wiring. The grounding wire 50*b* is electrically connected to the cover 5. The grounding wire 50*b* is connected to the flange portion 10. The grounding wire 50*b* is fixed by being attached to a later-described fourth recess 14 of the flange portion 10 with a screw.

The flange portion 10 has a ring shape that spreads radially outward from an edge of the peripheral wall portion 9 on the opposite side of the bottom wall portion 8. The flange portion 10 has an annular plate shape that spreads radially outward from an end portion of the peripheral wall portion 9 on the opposite side of the bottom wall portion 8 in the axial direction. A plate surface of the flange portion 10 is oriented in the axial direction and spreads in a direction perpendicular to the central axis J. A plate surface of the flange portion 10 of the first cup body 6A facing one axial side and a plate surface of the flange portion 10 of the second cup body 6B facing the other axial side come into contact with each other.

Figure 6:
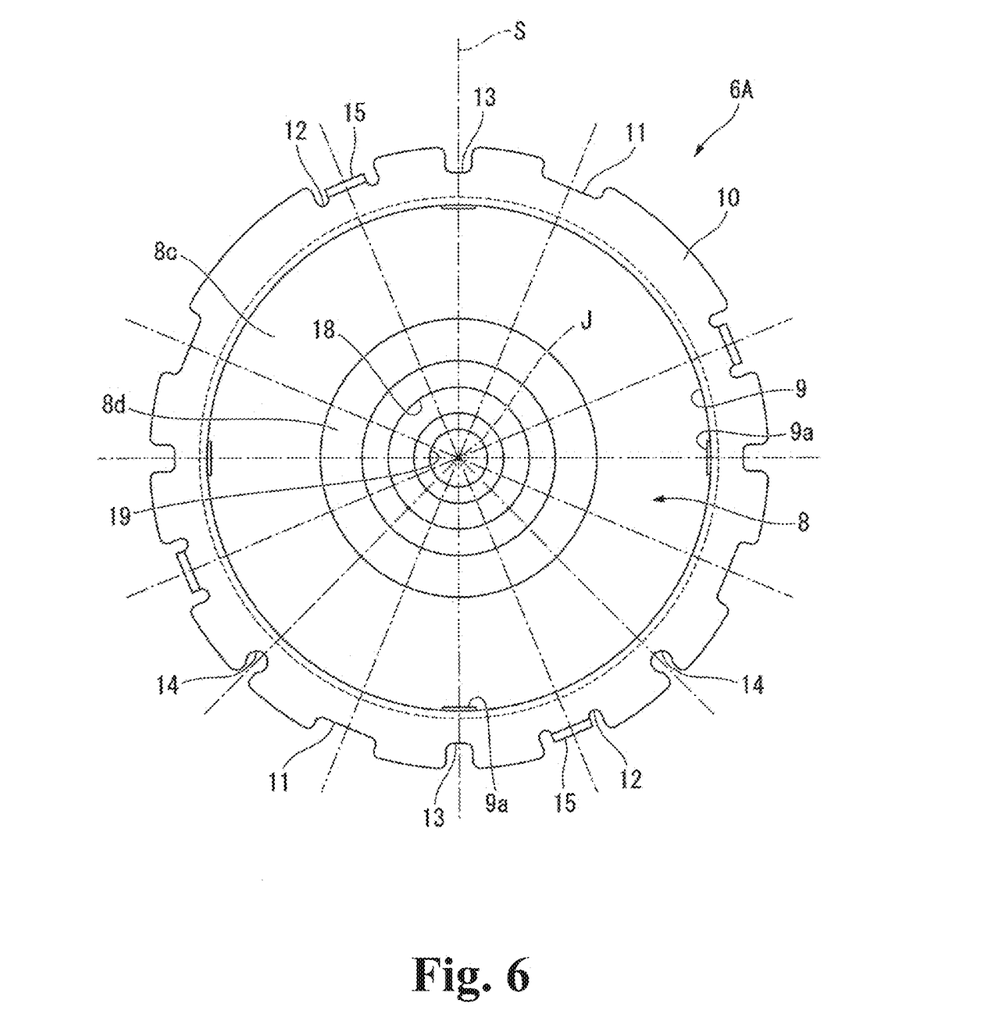
FIG. 6 is a plan view of the inside and a flange portion of a first cup body according to an example embodiment of the present disclosure as viewed in the axial direction.
Figure 7:
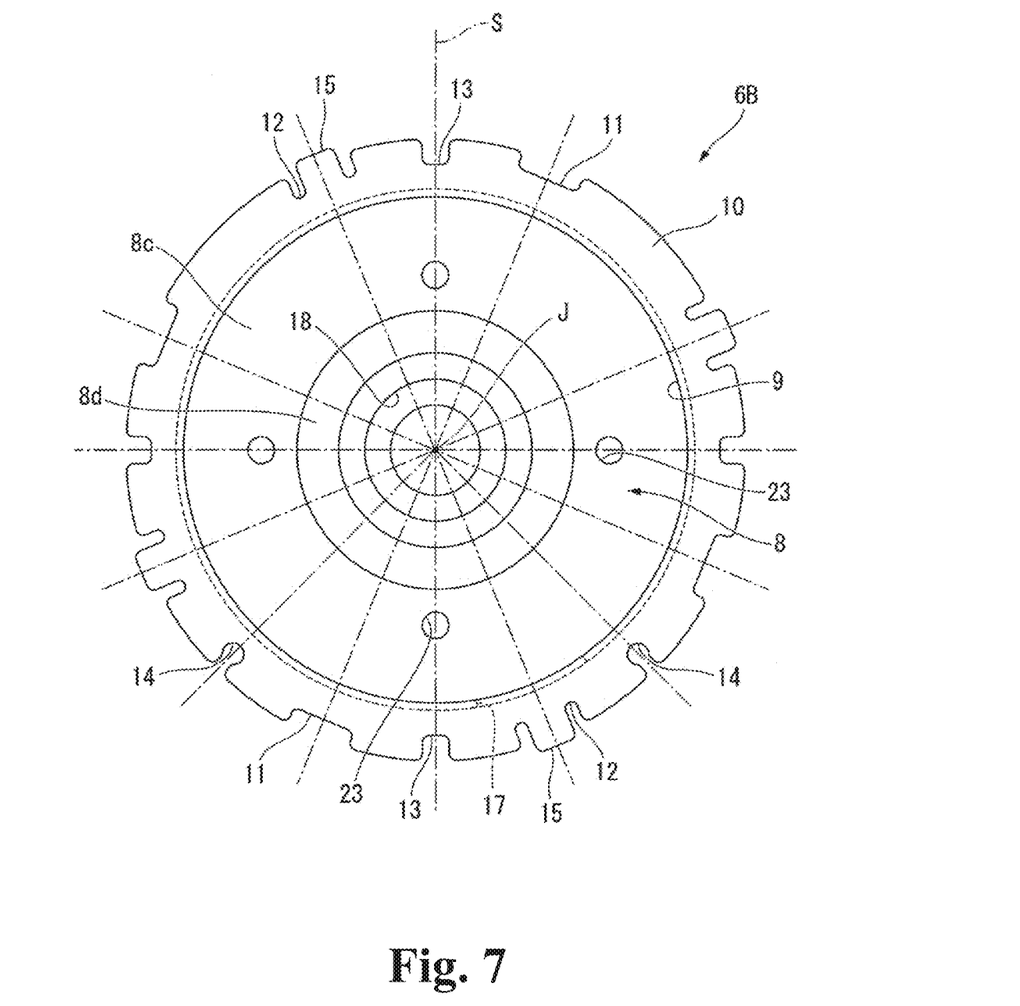
FIG. 7 is a plan view of the inside and a flange portion of a second cup body according to an example embodiment of the present disclosure as viewed in the axial direction.

The flange portion 10 of each of the first cup body 6A and the second cup body 6B has multiple first recesses 11, multiple second recesses 12, multiple claw portions 15, multiple third recesses 13, and the fourth recess 14. As shown in FIGS. 6 and 7, the multiple first recesses 11 are recessed radially inward from the outer peripheral edge of the flange portion 10, and are evenly spaced apart in the circumferential direction of the flange portion 10. Three or more first recesses 11 evenly spaced apart in the circumferential direction are provided in the flange portion 10. In the example of the present example embodiment, four first recesses 11 evenly spaced apart in the circumferential direction are provided in the flange portion 10. The first recess 11 has a longer length in the circumferential direction than its depth recessed radially inward from the outer peripheral edge of the flange portion 10.

The second recesses 12 are recessed radially inward from the outer peripheral edge of the flange portion 10, have the same circumferential width as that of the first recess 11, and are evenly spaced apart in the circumferential direction. In the flange portion 10, the number of second recesses 12 is the same as the number of first recesses 11. That is, the number of second recesses 12 is the same as the number of first recesses 11. Three or more second recesses 12 evenly spaced apart in the circumferential direction are provided in the flange portion 10. In the example of the present example embodiment, four second recesses 12 evenly spaced apart in the circumferential direction are provided in the flange portion 10. The second recess 12 has a longer length in the circumferential direction than its depth recessed radially inward from the outer peripheral edge of the flange portion 10.

The claw portion 15 extends radially outward from a bottom surface of the corresponding second recess 12, and has a circumferential width narrower than that of the second recess 12. The claw portion 15 has a rectangular plate shape extending in the radial direction, for example. Three or more claw portions 15 evenly spaced apart in the circumferential direction are provided in the flange portion 10. In the example of the present example embodiment, four claw portions 15 evenly spaced apart in the circumferential direction are provided in the flange portion 10. In the flange portion 10, the number of claw portions 15 is the same as the number of second recesses 12 and the number of first recesses 11. That is, the number of claw portions 15 is the same as the number of second recesses 12 and the number of first recesses 11. In the flange portion 10, the first recesses 11 and the claw portions 15 are evenly spaced apart and alternately arranged in the circumferential direction.

Figure 5:
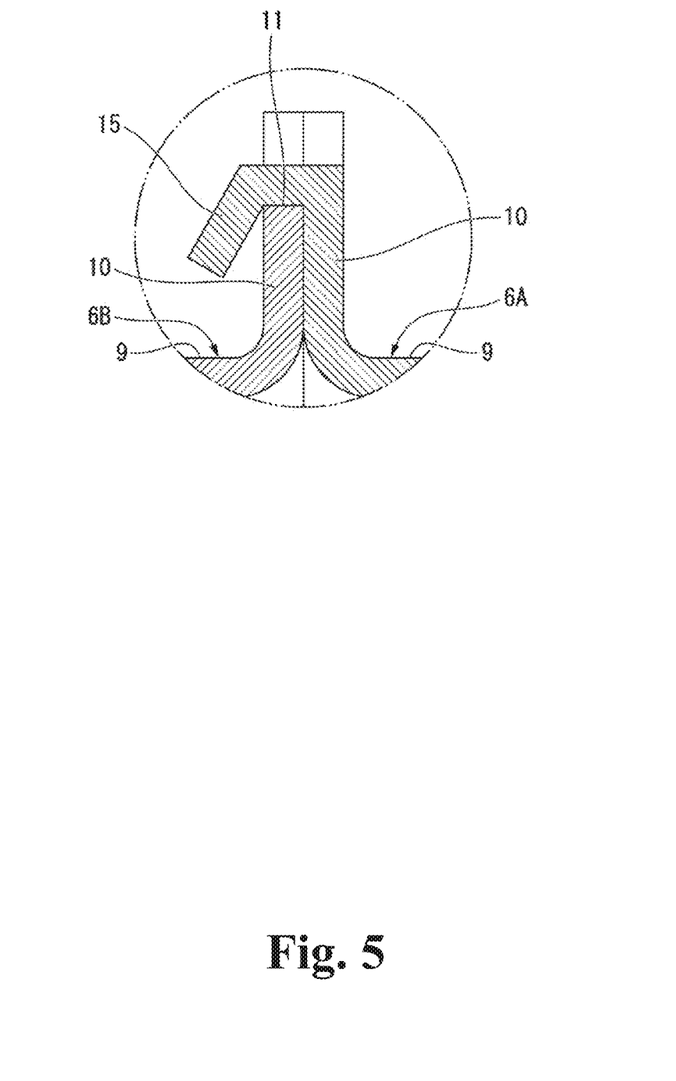
FIG. 5 is an enlarged cross-sectional view of section V of FIG. 4.

As shown in FIGS. 1 to 5, the first cup body 6A and the second cup body 6B are arranged with their flange portions 10 in contact with each other in the axial direction, and are fixed by hooking the claw portions 15 on the first recesses 11. In the present example embodiment, only the claw portion 15 of the first cup body 6A is hooked on the first recess 11 of the claw portions 15 of the first cup body 6A and the second cup body 6B. As shown in FIG. 5, the claw portion 15 can be folded back inward in the radial direction. FIG. 6 shows a state in which the claw portion 15 is folded back in the axial direction before being folded back radially inward. In FIG. 6, the claw portion 15 extends in the axial direction. FIG. 7 shows a state before the claw portion 15 is folded back. In FIG. 7, the claw portion 15 extends in the radial direction. As shown in FIG. 7, an end portion on the radially outer side of the claw portion 15 before being folded back protrudes farther to the radially outer side of the outer peripheral edge of the flange portion 10.

As shown in FIGS. 6 and 7, the multiple third recesses 13 are recessed radially inward from the outer peripheral edge of the flange portion 10, and are evenly spaced apart in the circumferential direction. Three or more third recesses 13 evenly spaced apart in the circumferential direction are provided in the flange portion 10. In the example of the present example embodiment, four third recesses 13 evenly spaced apart in the circumferential direction are provided in the flange portion 10. The number of third recesses 13 of the first cup body 6A and the number of third recesses 13 of the second cup body 6B are the same. The third recess 13 is arranged in an intermediate position in the circumferential direction between the first recess 11 and the claw portion 15 adjacent to each other in the circumferential direction in the flange portion 10. The depth at which the third recess 13 is recessed radially inward from the outer peripheral edge of the flange portion 10 is deeper than the depth of the first recess 11 or the second recess 12. The third recess 13 is shorter in the circumferential direction than the first recess 11 and the second recess 12.

The fourth recess 14 is recessed radially inward from the outer peripheral edge of the flange portion 10. The fourth recess 14 has a maximum width in the circumferential direction at a portion located radially inward of the outer peripheral edge of the flange portion 10. The fourth recess 14 has a shape in which a part of the inner periphery of a circular hole opens to the outer peripheral edge of the flange portion 10. The fourth recess 14 has an internal thread on its inner periphery. The fourth recess 14 does not necessarily have to have an internal thread on its inner periphery. As shown in FIGS. 6 and 7, in axial view of the flange portion 10, in the flange portion 10, a pair of the fourth recesses 14 are provided in positions symmetrical with respect to a symmetry axis S which is a predetermined radial direction passing through the central axis J. When the first cup body 6A and the second cup body 6B are arranged with their flange portions 10 in contact with each other in the axial direction, the fourth recess 14 of the first cup body 6A and the fourth recess 14 of the second cup body 6B face each other in the axial direction. As shown in FIGS. 1 to 3, the grounding wire 50b is attached to the fourth recess 14. As shown in FIGS. 3 and 7, the through hole 17 of the peripheral wall portion 9 is arranged between the pair of fourth recesses 14 along the circumferential direction.

As shown in FIG. 4, the rotor 2 has the motor shaft 3 and the rotor magnet 2a. Of the motor shaft 3, a portion supported by the pair of bearings 7 and a portion located between the pair of bearings 7 are disposed inside the cover 5. Of the motor shaft 3, a portion located on the other axial side of the bearing 7 accommodated in the first cup body 6A is disposed outside the cover 5. The motor shaft 3 and the pair of bearings 7 are restrained from moving relative to each other in the axial direction by a retaining ring or the like. The rotor magnet 2a has a tubular shape centered on the central axis J. The rotor magnet 2a has a cylindrical shape. The rotor magnet 2a is fixed to an outer peripheral surface of the motor shaft 3.

The stator 4 is fitted into the cover 5. The stator 4 is fitted into the first cup body 6A or the second cup body 6B. In the present example embodiment, the stator 4 is fitted and fixed to an inner peripheral surface of the peripheral wall portion 9 of the first cup body 6A. The stator 4 faces the rotor 2 with a gap interposed therebetween in the radial direction. The stator 4 faces the rotor 2 from the outside in the radial direction. The stator 4 has a stator core 26, a coil 27, and an insulating portion 28. The stator core 26 has a ring shape that surrounds the outer side of the rotor 2 in the radial direction. The stator core 26 faces the rotor magnet 2a with a gap interposed therebetween in the radial direction. The stator core 26 faces the rotor magnet 2a from the outside in the radial direction.

The coil 27 is attached to the stator core 26. The coil is attached to the stator core 26 indirectly through the insulating portion 28. The insulating portion 28 has a portion disposed between the stator core 26 and the coil 27. The insulating portion 28 has a portion facing the coil 27 from the radial direction. That is, the insulating portion 28 faces the coil 27 from the radial direction. The insulating portion 28 has an outer peripheral insulating portion 28a located on the radially outer side of the coil 27 and an inner peripheral insulating portion 28b located on the radially inner side of the coil 27. The outer peripheral insulating portion 28a faces the coil 27 from the radially outer side. The inner peripheral insulating portion 28b faces the coil 27 from the radially inner side. The base plate 20 is attached and fixed to the outer peripheral insulating portion 28a.

The base plate 20 is located on one axial side of the stator 4. The base plate 20 has a disk shape. The base plate 20 has an annular plate shape centered on the central axis J. A plate surface of the base plate 20 is oriented in the axial direction and spreads in a direction perpendicular to the central axis J. The motor shaft 3 extends in the axial direction on the radially inner side of the base plate 20.

The base plate 20 is electrically connected to the stator 4. The base plate 20 is electrically connected to a coil lead wire (not shown) of the coil 27. The base plate 20 is connected to the coil lead wire in an outer peripheral edge portion of a plate surface of the base plate 20 facing one axial side. The base plate 20 is located on one axial side of the rotor magnet 2*a*. In axial view, the base plate 20 is disposed in a position overlapping the stator 4 and the rotor magnet 2*a*. The base plate is surrounded from the radially outer side by the outer peripheral insulating portion 28*a*. In radial view, the base plate 20 is disposed in a position overlapping the outer peripheral insulating portion 28*a*. In the example of the present example embodiment, in radial view, the base plate 20 is disposed in a position overlapping the flange portion 10 of the second cup body 6B.

Although not shown, an integrated circuit and a capacitor are mounted on the plate surface of the base plate 20. The base plate 20 is arranged with the plate surface on which the integrated circuit and the capacitor are mounted facing toward one axial side. The integrated circuit has a rectangular plate shape. The capacitor has a circular column shape. The capacitor extends in the axial direction. A surface of the capacitor facing one axial side faces the bottom wall portion 8 of the second cup body 6B from the axial direction. A surface of the capacitor facing one axial side is disposed so as to face a surface of the bottom wall portion 8 facing the other axial side with a gap interposed therebetween.

The heat sink 21 is disposed on one axial side of the base plate 20. The heat sink 21 is in thermal contact with the integrated circuit. The heat sink 21 is fixed to the cover 5. As shown in FIG. 3, the heat sink 21 is attached and fixed to the bottom wall portion 8 of the second cup body 6B with the screw member 25. The screw member 25 fastens the flat portion 8*c* of the second cup body 6B and the heat sink 21. Multiple screw members 25 are provided. The multiple screw members 25 are spaced apart in the circumferential direction in the bottom wall portion 8.

According to the present example embodiment, the first cup body 6A and the second cup body 6B can be easily assembled by hooking the claw portion 15 on the first recess 11. Then, the flange portion 10 of each of the first cup body 6A and the second cup body 6B has a first recess 11 and a second recess 12. Hence, an alignment pin or the like may be provided on an assembly jig or the like of the cover 5 used at the time of assembly of the motor 1, for example, and the alignment pin or the like may be inserted into both end portions in the circumferential direction of each of the first recess 11 and the second recess 12 facing each other in the axial direction, so that the first cup body 6A and the second cup body 6B can be aligned coaxially. As a result, the bearing 7 held by the first cup body 6A and the bearing 7 held by the second cup body 6B can be arranged coaxially, and the rotation of the motor shaft 3 is stabilized.

Even if the cover 5 is made of sheet metal as in the present example embodiment, the coaxiality between the bearings 7 of the first cup body 6A and the second cup body 6B can be increased. Additionally, in the present example embodiment, since the first cup body 6A and the second cup body 6B have the same axial dimension and radial dimension, the first cup body 6A and the second cup body 6B can be press-molded with the same mold. Equipment costs are reduced and production efficiency is improved.

In the present example embodiment, three or more first recesses 11 evenly spaced apart in the circumferential direction are provided in the flange portion 10. Accordingly, three or more second recesses 12 and claw portions 15, the numbers of which are the same number of first recesses 11, are provided. Hence, the operation of aligning the first cup body 6A and the second cup body 6B coaxially becomes easy. The fixture between the flange portions 10 is stabilized.

In the present example embodiment, the number of third recesses 13 of the first cup body 6A and the number of third recesses 13 of the second cup body 6B are the same. Hence, an alignment pin or the like may be inserted into the pair of third recesses 13 facing each other in the axial direction, for example, so that the first cup body 6A and the second cup body 6B can be aligned coaxially. Further, in the present example embodiment, the third recess 13 is arranged in an intermediate position in the circumferential direction between the first recess 11 and the claw portion 15 adjacent to each other in the circumferential direction in the flange portion 10. Accordingly, when the first cup body 6A and the second cup body 6B are coaxially aligned using the third recess 13, since the first recess 11 and the claw portion 15 face each other in the axial direction, it is easy to hook the claw portion 15 on the first recess 11.

In the present example embodiment, in the flange portion 10, the first recesses 11 and the claw portions 15 are evenly spaced apart and alternately arranged in the circumferential direction. Hence, it is easy to align the first recess 11 and the claw portion 15 that face each other in the axial direction. Additionally, in the present example embodiment, the fourth recess 14 of the first cup body 6A and the fourth recess 14 of the second cup body 6B face each other in the axial direction. Hence, when the grounding wire 50*b* is screwed to the fourth recess 14, the effective length of the screw can be secured, and the mounted state of the grounding wire 50*b* is stabilized.

In the present example embodiment, in axial view of the flange portion 10, a pair of fourth recesses 14 are provided in positions symmetrical with respect to the symmetry axis S. In this case, a mold for molding the flange portions 10 of the first cup body 6A and the second cup body 6B can be shared. Further, since the through hole 17 of the peripheral wall portion 9 is disposed between the pair of fourth recesses 14 along the circumferential direction, the through hole 17 can be disposed close to one of the pair of fourth recesses 14. The cables 50*a* are passed through the through hole 17, and the cables 50*a* and the grounding wire 50*b* are bundled with a binding band or the like. Hence, the grounding wire 50*b* is easily routed toward the fourth recess 14 of the flange portion 10.

In the present example embodiment, since the end portion of the claw portion 15 on the radially outer side before being folded protrudes farther to the radially outer side of the outer peripheral edge of the flange portion 10, the claw portion 15 is elongated in the radial direction and easily folded. Moreover, the claw portion 15 after being folded back functions stably. Additionally, in the present example embodiment, of the claw portions 15 of the first cup body 6A and the second cup body 6B, only the claw portion 15 of the first cup body 6A is hooked on the first recess 11. Hence, it is possible to simplify the motor manufacturing process while sharing the mold for forming the flange portions 10 of the first cup body 6A and the second cup body 6B.

For example, as shown in FIG. 4, when the stator 4 is fitted to only one of the first cup body 6A and the second cup body 6B, the first cup body 6A and the second cup body 6B cannot be coaxially aligned by using the stator 4. That is, an outer peripheral surface of the stator 4 cannot be used for centering the pair of cup bodies 6A and 6B. According to the present example embodiment, since the pair of cup bodies 6A and 6B can be aligned coaxially without using the stator 4, the degree of freedom of the arrangement position of the stator 4 in the cover 5 is increased. As a result, it is possible to arrange the base plate 20 in the vicinity of the central portion in the axial direction in the cover 5 as shown in FIG. 4, for example. Hence, the motor can be reduced in size in the axial direction while a space for arranging the capacitor mounted on the base plate 20 is secured.

Next, a motor of a second example embodiment of the present disclosure will be described. Note that in the second example embodiment, the same components as those in the first example embodiment are denoted by the same reference numerals, description thereof is omitted, and only different points will be mainly described.

Figure 8:
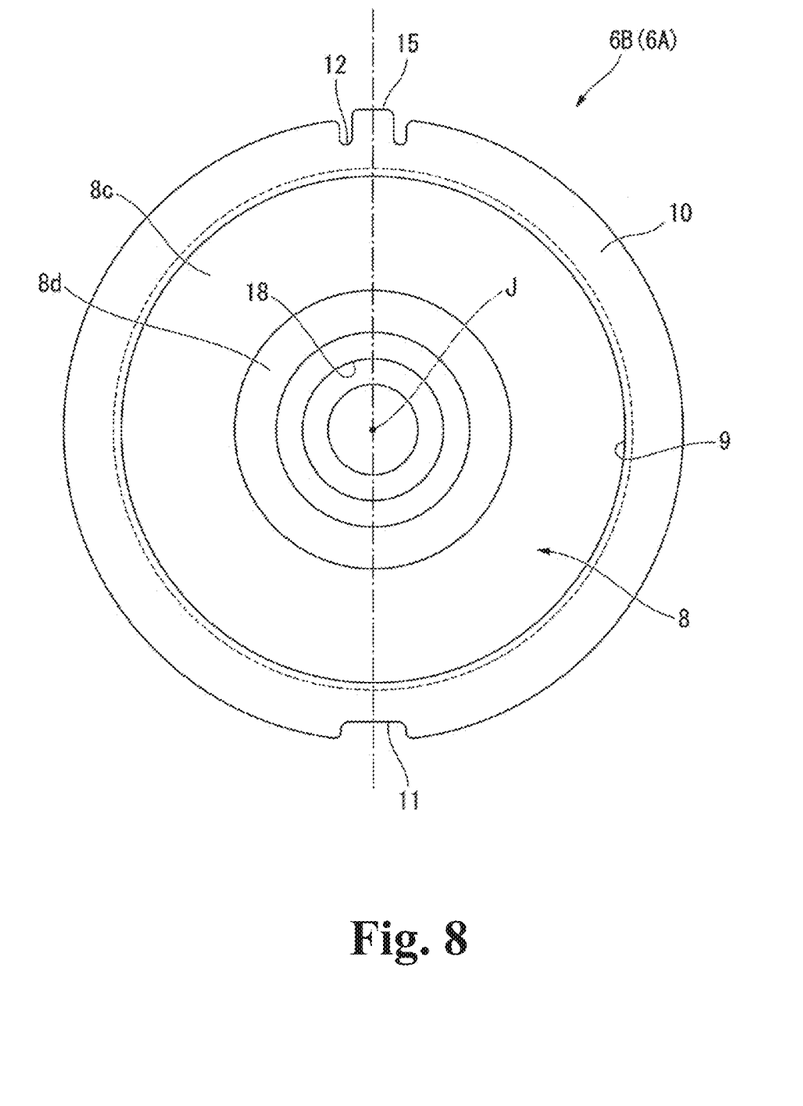
FIG. 8 is a plan view of the inside and a flange portion of a second cup body (first cup body) of a motor according to a second example embodiment of the present disclosure as viewed in the axial direction.

As shown in FIG. 8, in the motor of the present example embodiment, the configuration of a flange portion 10 of each of a first cup body 6A and a second cup body 6B is different from the above-described example embodiment. The flange portion 10 has a first recess 11, a second recess 12, and a claw portion 15 one by one. The first recess 11 is recessed radially inward from the outer peripheral edge of the flange portion 10. The second recess 12 is arranged 180 degrees away from the first recess 11 in the circumferential direction of the flange portion 10, and has the same circumferential width as that of the first recess 11. The claw portion 15 extends radially outward from a bottom surface of the second recess 12, and has a narrower circumferential width than that of the second recess 12. The first cup body 6A and the second cup body 6B are arranged with their flange portions 10 in contact with each other in the axial direction, and are fixed by hooking the claw portion 15 of one of the first cup body 6A and the second cup body 6B on the first recess 11 of the other.

According to the present example embodiment, the first cup body 6A and the second cup body 6B can be easily assembled by hooking the claw portion 15 on the first recess 11. An alignment pin or the like may be provided on an assembly jig or the like of the cover 5 used at the time of assembly of the motor 1, for example, and the alignment pin or the like may be inserted into both end portions in the circumferential direction of each of the first recess 11 and the second recess 12 facing each other in the axial direction, so that the first cup body 6A and the second cup body 6B can be aligned coaxially. As a result, the bearing 7 held by the first cup body 6A and the bearing 7 held by the second cup body 6B can be arranged coaxially, and the rotation of the motor shaft 3 is stabilized.

Note that the present disclosure is not limited to the above-described example embodiment. For example, as described below, the configuration can be modified without departing from the gist of the present disclosure.

While the first cup body 6A and the second cup body 6B of the above-described example embodiment have the same axial dimension and radial dimension, they may be different. The arrangement and shape of the first recess 11, the second recess 12, the claw portion 15, the third recess 13, and the fourth recess 14 in the flange portion 10 are not limited to the configuration described in the above example embodiment. Instead of being provided in the peripheral wall portion 9 of the second cup body 6B, the through hole 17 may be provided in the peripheral wall portion 9 of the first cup body 6A.

In addition, without departing from the gist of the present disclosure, the configurations (components) described in the above-described example embodiments, modifications, notes, and the like may be combined, and additions, omissions, substitutions, and other modifications of configurations can be made. Further, the present disclosure is not limited by the above-described example embodiments, and is limited only by the scope of the claims.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
   a rotor that includes a motor shaft extending along a central axis;
   a stator that opposes the rotor with a gap interposed between the stator and the rotor in a radial direction;
   a pair of bearings that rotatably support the motor shaft; and
   a cover that accommodates the rotor and the stator; wherein:
   the cover includes a first cup body and a second cup body both including a bottomed tubular shape;
   each of the first cup body and the second cup body includes:
   a bottom wall portion that includes a bearing holding portion to hold the bearings;
   a tubular peripheral wall portion that extends in an axial direction from an outer peripheral edge of the bottom wall portion; and
   a ring-shaped flange portion that extends radially outward from an end edge of the peripheral wall portion opposite to the bottom wall portion;
   the flange portion of each of the first cup body and the second cup body includes:
   a plurality of first recesses that are recessed radially inward from an outer peripheral edge of the flange portion and are evenly spaced apart in a circumferential direction of the flange portion;
   second recesses that are recessed radially inward from the outer peripheral edge of the flange portion, each of the second recesses having a same circumferential width as a circumferential width of each of the first recesses, and are evenly spaced apart in the circumferential direction, the number of the second recesses is the same as the number of first recesses; and
   claw portions that each extend radially outward from a bottom surface of the second recess and have a circumferential width narrower than a circumferential width of the second recess; and
   the first cup body and the second cup body are arranged with flange portions of the first cup body and the second cup body in contact with each other in the axial direction, and are fixed by hooking the claw portions on the first recesses.

2. The motor according to claim 1, wherein the cover is made of sheet metal.

3. The motor according to claim 2, wherein the first cup body and the second cup body have the same axial dimension and radial dimension.

4. The motor according to claim 1, wherein three or more of the first recesses are evenly spaced apart in the circumferential direction in the flange portion.

5. The motor according to claim 1, wherein the flange portion of each of the first cup body and the second cup body includes a plurality of third recesses that are recessed radially inward from the outer peripheral edge of the flange portion and are evenly spaced apart in the circumferential direction; and a total number of third recesses of the first cup body and a total number of third recesses of the second cup body are the same.

6. The motor according to claim 5, wherein
each of the third recesses is in an intermediate position in the circumferential direction between the first recess and the claw portion adjacent to each other in the circumferential direction in the flange portion.

7. The motor according to claim 1, wherein
the first recesses and the claw portions are evenly spaced apart and arranged alternately in the circumferential direction in the flange portion.

8. The motor according to claim 1, wherein
the flange portion of each of the first cup body and the second cup body includes a fourth recess to which a grounding wire is attached; and
the fourth recess of the first cup body and the fourth recess of the second cup body oppose each other in the axial direction.

9. The motor according to claim 8, wherein
in axial view of the flange portion, in the flange portion, a pair of the fourth recesses are provided in positions symmetrical with respect to a symmetry axis which is a predetermined radial direction passing through the central axis.

10. The motor according to claim 9, wherein
the peripheral wall portion of the first cup body or the second cup body is provided with a through hole that penetrates the peripheral wall portion in the radial direction; and
the through hole is between a pair of the fourth recesses along the circumferential direction.

11. The motor according to claim 1, wherein
the claw portion is foldable back inward in the radial direction; and
an end portion on a radially outer side of the claw portion protrudes farther to a radially outer side of the outer peripheral edge of the flange portion before being folded back than after being folded back.

12. The motor according to claim 1, wherein
of the claw portions of the first cup body and the second cup body, only the claw portion of the first cup body is hooked on the first recess.

13. The motor according to claim 1, wherein
the stator is fitted into the first cup body or the second cup body.

14. A motor comprising:
a rotor that includes a motor shaft extending along a central axis;
a stator that opposes the rotor with a gap interposed between the stator and the rotor in a radial direction;
a pair of bearings that rotatably support the motor shaft; and
a cover that accommodates the rotor and the stator; wherein:
the cover includes a first cup body and a second cup body both including a bottomed tubular shape;
each of the first cup body and the second cup body includes:
 a bottom wall portion that includes a bearing holding portion to hold the bearings;
 a tubular peripheral wall portion that extends in an axial direction from an outer peripheral edge of the bottom wall portion; and
 a ring-shaped flange portion that extends radially outward from an end edge of the peripheral wall portion opposite to the bottom wall portion;
the flange portion includes:
 a first recess that is recessed radially inward from an outer peripheral edge of the flange portion;
 a second recess that is arranged 180 degrees away from the first recess in a circumferential direction of the flange portion, and has a same circumferential width as a circumferential width of the first recess; and
 a claw portion that extends radially outward from a bottom surface of the second recess and has a circumferential width narrower than a circumferential width of the second recess; and
the first cup body and the second cup body are arranged with flange portions of first cup body and the second cup body in contact with each other in the axial direction, and are fixed by hooking the claw portion of one of the first cup body and the second cup body on the first recess of the other.

* * * * *